L. F. BUFF.
SOLAR ATTACHMENT FOR TRANSITS.
APPLICATION FILED FEB. 18, 1915.

1,190,719.

Patented July 11, 1916.
3 SHEETS—SHEET 1.

Witnesses:
Horace A. Crossman
Carl L. Choate

Inventor:
Louis F. Buff,
by Emery, Booth, Janney & Varney
Attys

L. F. BUFF.
SOLAR ATTACHMENT FOR TRANSITS.
APPLICATION FILED FEB. 18, 1915.
1,190,719.
Patented July 11, 1916.
3 SHEETS—SHEET 2.
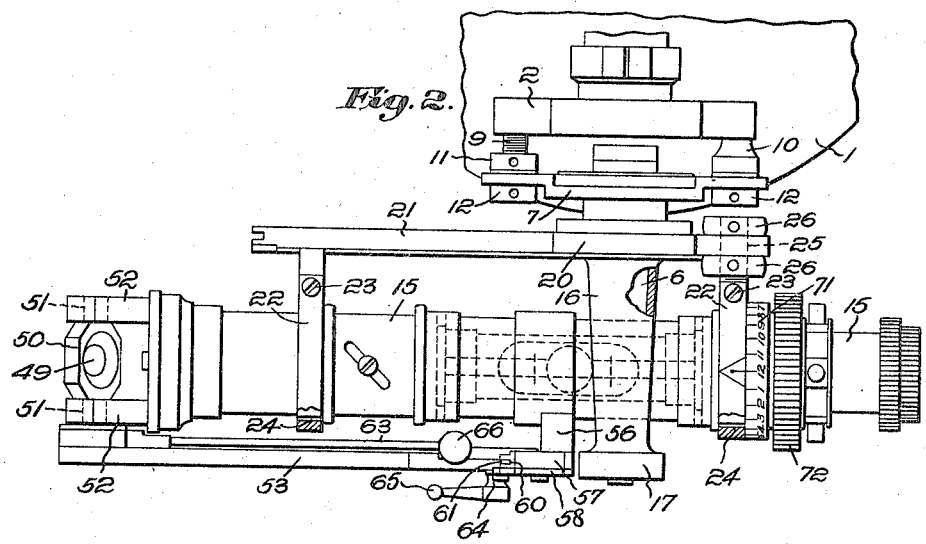
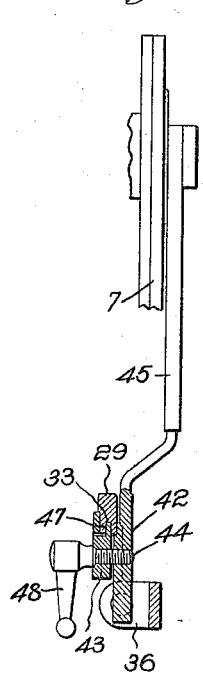
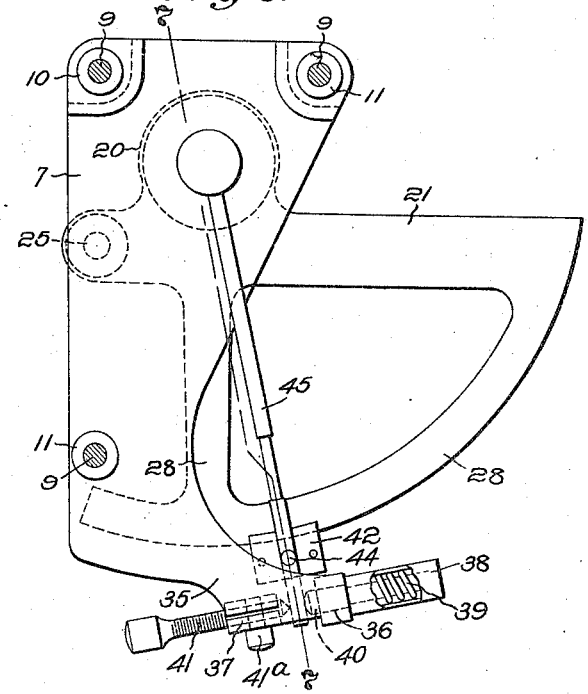
Witnesses:
Horace A. Crossman
Carl L. Choate
Inventor:
Louis F. Buff,
by Emery, Booth, Janney & Varney
Attys.

L. F. BUFF.
SOLAR ATTACHMENT FOR TRANSITS.
APPLICATION FILED FEB. 18, 1915.
1,190,719.
Patented July 11, 1916.
3 SHEETS—SHEET 3.
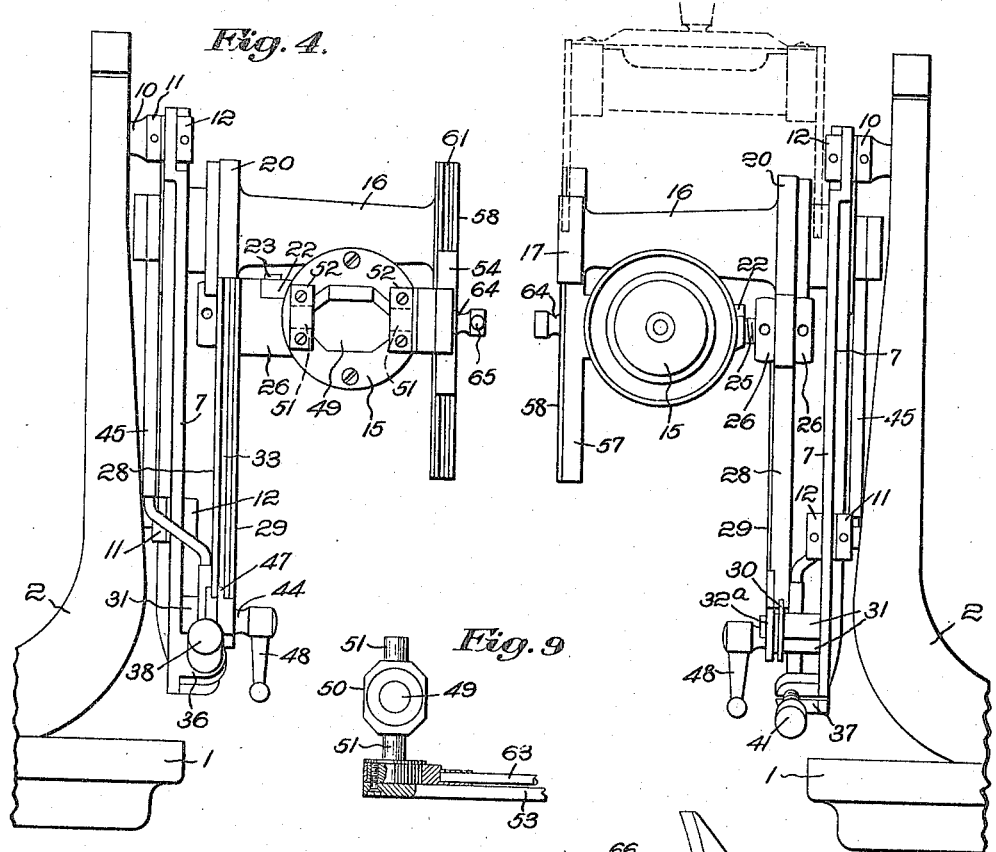
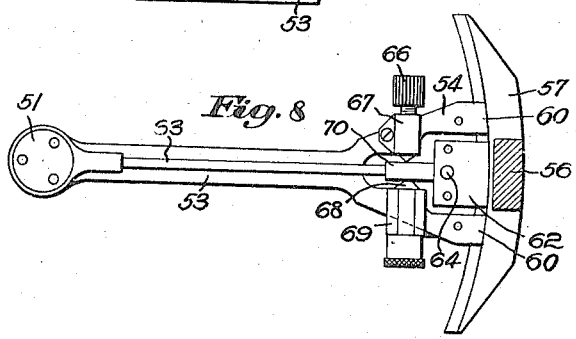
Witnesses:
Horace A. Crossman
Carl L. Choate.
Inventor:
Louis F. Buff,
by Emery, Booth, Janney & Varney
Attys.

UNITED STATES PATENT OFFICE.

LOUIS F. BUFF, OF JAMAICA PLAIN, MASSACHUSETTS.

SOLAR ATTACHMENT FOR TRANSITS.

1,190,719.　　　　　　Specification of Letters Patent.　　Patented July 11, 1916.

Application filed February 18, 1915. Serial No. 9,015.

*To all whom it may concern:*

Be it known that I, LOUIS F. BUFF, a citizen of the United States, and a resident of Jamaica Plain, county of Suffolk, and State of Massachusetts, have invented an Improvement in Solar Attachments for Transits, of which the following description, in connection with the accompanying drawings, is a specification, like characters on the drawings representing like parts.

This invention relates to solar transits, and the aim of the invention is to provide a solar attachment for determining the true meridian embodying many novel features, adapted to be mounted on a usual transit by means of which increased accuracy, convenience and general efficiency may be obtained, and which have been hitherto impossible of attainment with existing instruments.

The solar attachment is constantly being used to an increasing extent by surveyors, on account of its superior efficiency and convenience, and this increased use has shown the defects of the common forms of solar attachments and has made more evident the need of an improved and more efficient instrument.

My invention will be more clearly understood by reference to the drawings of an illustrative embodiment thereof accompanying this specification, and wherein—

Figure 1:
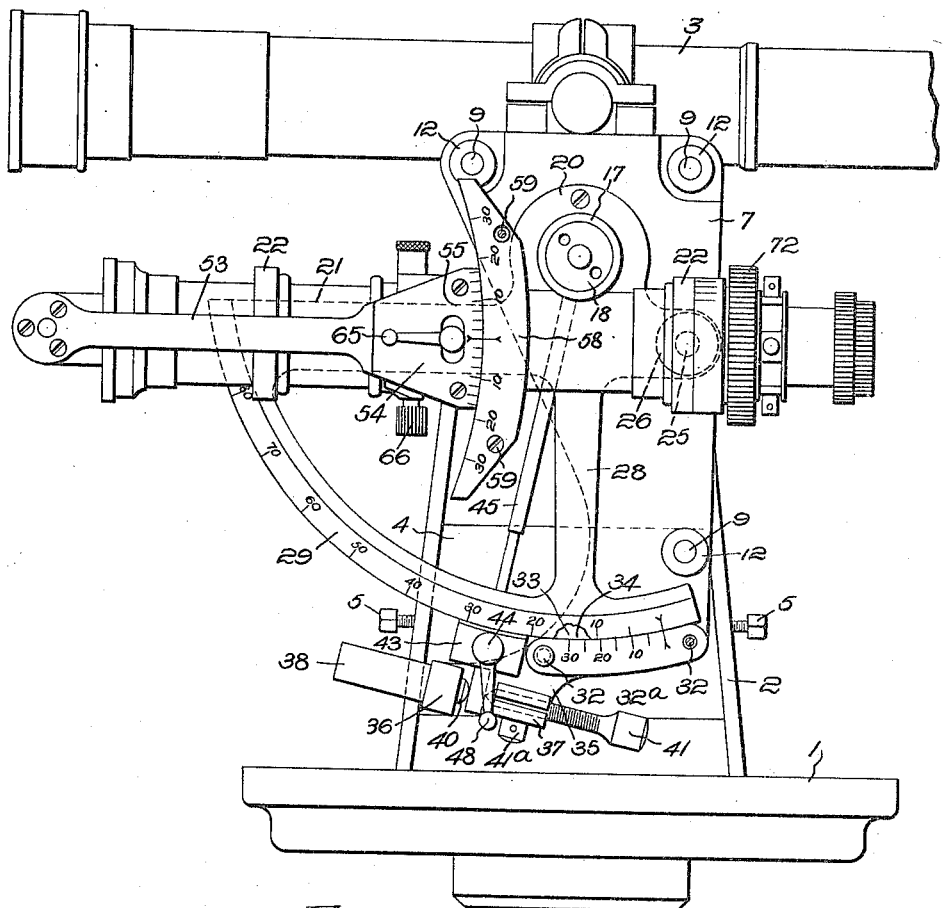
Figure 5:
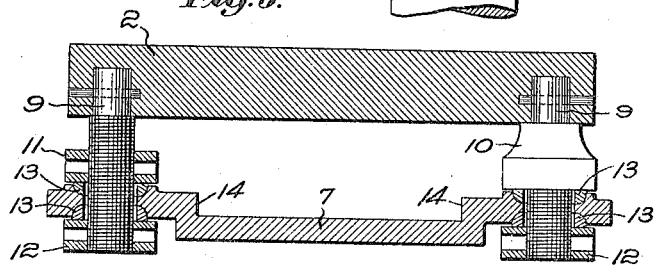

Figure 1 is a side elevation of the solar attachment, in horizontal position, on a usual transit, parts being broken away; Fig. 2, a plan of the attachment as shown in Fig. 1, partly broken away; Fig. 3, a front end view of the solar telescope, and edge view of the coöperating parts of the attachment mounted on a transit partly broken away; Fig. 4, an opposite end and edge view of the same parts; Fig. 5, a cross-sectional view substantially on the line of the lower edge of the telescope 1, Fig. 1, of the solar attachment base or mounting plate, showing the adjustable locking means therefor, including means for mounting the base on a transit standard, parts being broken away; Fig. 6, a detail of the rear face of the solar telescope mounting plate, the latitude arc and vernier mounted thereon, and adjusting means therefor; Fig. 7, an edge detail elevation of the latitude arc and vernier adjusting means; Fig. 8, a detail plan on an enlarged scale of the rear face of the declination arc and vernier and adjusting means therefor; and Fig. 9, a plan of the reflector and its mounting of the solar telescope.

The embodiment of my improved solar attachment illustrated, is designed to be mounted, see Figs. 1 to 4, on the left hand or east standard and at one side of the main telescope of a usual transit, and I have herein so shown it. Referring first to Fig. 1, the usual base plate 1 of the transit is shown as provided with the standard 2, which carries the main telescope 3. This standard may be provided at one side, see Fig. 1, and opposite the solar attachment, to be described, with a counterweight 4 for balancing the transit, and this counterweight may be constructed integral with the standard or it may be removable, as herein, and secured in position thereon by any convenient means, as the set screws 5—5. Solar telescopes have heretofore been mounted directly on the main telescope, in the same vertical plane therewith and on the same horizontal axis; and they also have been pivoted horizontally close to the side of the standard, and in the latter position, in some cases on a bearing extended inwardly beneath the main telescope, between the posts of the standard, with their axes in the same vertical plane with the main telescope. This latter feature is, however, unnecessary. These forms of construction, however, have been extremely inconvenient and unsatisfactory for several reasons, an important one being that, when so mounted, it has been impossible to adjust the solar telescope axis horizontally by the use of the striding level, a most convenient and satisfactory means for adjusting the telescope for horizontality. In the latter case it has been necessary to remove the solar attachment bodily from its mounting, substitute a dummy shaft therefor, and to which a level has been applied by suspending it therefrom, to obtain the horizontal adjustment thereof, the dummy shaft being afterward removed and the solar attachment replaced.

In addition to the labor required for effecting the above adjustment as well as the time consumed, it has been found that frequently proper adjustment of the solar telescope was not obtained from the fact that a minute piece of dust or other foreign matter would find its way, particularly in a strong wind, into the bearing, between the time of removing the dummy and the replacing of the solar attachment, and this foreign matter would affect the horizontality of the solar telescope when replaced in position. To obviate this difficulty and overcome the inconveniences not mentioned, and expeditiously and conveniently to obtain accurate horizontal adjustment thereof in a plane parallel with and preferably normal to the axis of the main telescope 3, I have conceived the idea of mounting the solar telescope, see Figs. 2 to 4, upon a bearing post 6, extended laterally and outwardly relative to and from the standard 2, thus permitting free and convenient application of the striding level thereto, see dotted lines, Figs. 2, 3. By this means proper adjustment may be obtained almost instantaneously, without reference to climate or other conditions. For permitting the application of my improved solar attachment to any usual transit standard and for quickly, conveniently and accurately effecting this horizontal adjustment of the bearing 6 and the solar telescope relative to the main telescope 3, and also for effecting its vertical alinement in the same plane with the axis of the main telescope, Fig. 1, I have conceived the idea of mounting the entire solar attachment upon what I have termed a solar attachment base or mounting member, herein a plate 7, of novel design, and provided with novel bearings and adjusting means which I will now describe. I prefer to make this mounting member or base 7, Fig. 1, substantially triangular in form and provide it with three bearing points, one near each corner. The adjusting and supporting members for the plate 7 comprise three posts 9 to which the plate 7 is adjustably secured, and adapted to be secured in any convenient manner as by pins to one side of the standard 2, two of the posts 9 being in substantial horizontal alinement near the upper end or horizontal edge of the base, while the third post is in substantially the same vertical plane with one of the first-named posts and adjacent the perpendicular edge of the base 7. The post 9 at the right angle of the base 7 is provided with a washer 10 which may be either loose or fixed thereon, while the two remaining posts 9 are threaded substantially throughout their length to receive opposed locking members as nuts 11, 12, which coöperate with the washer 10 to receive the base 7, and locking it in adjusted position on the posts.

To provide for the most delicate and accurate adjustment of the base 7 without bending the same and without torsional strain, each post 9, Fig. 5, carries a pair of adjusting capstan collars 13—13, shown herein as segmental in cross-section, the opposite faces of the base being recessed to receive these collars, suitable clearance between them and the posts 9 being provided for adjustment. To adjust the base 7 it is preferably locked to its post 9 at its right angle corner and substantial adjustment both vertically and laterally is then obtained by means of the lock nuts 11—12 on each of the remaining posts 9. It will be evident that the base 7 being locked at its right angle corner it may be accurately adjusted vertically or leveled by simply adjusting the two opposed lock nuts 11—12 at the lower end of the base 7. Lateral adjustment may be accurately obtained by simply adjusting the two remaining opposed lock nuts 11 and 12, at the remaining upper angle of the base 7, the base in each instance turning on the capstan collars 13—13 on the posts 9—9, sufficiently without torsional strain to or bending of the base 7. The base 7 may be offset at the corners as at 14, to bring it close to the standard 2 for compactness. By the above construction each corner of the base 7 is substantially provided with a universal joint permitting free adjustment in any direction.

For supporting the solar telescope 15, the base 7, Fig. 1, carries a laterally and outwardly extended post 6 previously referred to, and herein, in substantially the same vertical axial plane with and parallel to the axis 8 of the main telescope 3. This shaft 6, Fig. 2, shown as tapering, carries a sleeve or telescope supporting member 16, having a flanged outer end 17 to receive a round nut 18 threaded to the end of the shaft 6 for retaining the sleeve 16 thereon. The sleeve 16, at its inner end, see Figs. 2 and 3, has a flange 19, to which is secured as by screws, see Fig. 1, the collar portion 20 of a telescope carrying member or bar 21, best shown in Figs. 2 and 6. This bar 21 is provided, see Figs. 1, 3, 4, at each end, with a telescope bearing and support 22, as a split ring, for rotatably carrying the solar telescope 15. Each support is provided, Figs. 2, 4, with suitable locking means as screws 23—23, by which the rings 22—22, may be tightened about the telescope. The bearing ring 22 at the rear or objective end of the telescope, see Fig. 2, may be provided with any rigid support 27, secured to the member 21. To permit accurate adjustment of the telescope 15 in its bearings 22 and provide for free and accurate rotation of the telescope about its true axis, these rings 22—22, are preferably recessed, see Fig. 2, at any convenient point or points thereon as at 24—24, to permit them more readily to adapt themselves to the surface of the collars (not shown) on the telescope and on which they bear. This construction provides substantially a three-point support on each ring for each end of the telescope, and permits free lateral adjustment thereof relative to the transit and its main telescope. The bearing ring 22 at the forward end of the telescope, see Figs. 2, 3, is adjustably carried by a post 25 secured to the bar 21 by lock nuts 26—26 at opposite sides thereof, by means of which the lateral adjustment of the ring 22 and telescope 15 relatively to the carrying member 21 may be accurately and quickly effected with the coöperation of the three point supporting rings already described. At its forward, Fig. 1, right-hand end carrying member or bar 21 is provided with a depending arc carrying arm 28, which carries at its lower end, one end of the usual latitude arc 29, the opposite end being carried by the opposite or, Fig. 1, rear end of the bar 21. For coöperating with this arc there is provided, see Fig. 1, the usual vernier 30, herein carried, Figs. 4 and 6, by posts 31—31, laterally extended from the base 7 and having their outer ends reduced in size.

To permit quick and necessarily delicate adjustment of the graduations of the vernier to the graduations of the arc, the vernier is provided at its ends with apertures somewhat larger than the ends of its supporting posts 31—31, so that the vernier may be adjusted both vertically and horizontally to cause it to register with the arc 29, and it may be locked in position thereon by screws 32—32. The vernier graduations may, of course, be indicated on the member 30 itself or upon a plate 32ᵃ carried thereby.

It frequently happens in field work, particularly under rough and adverse conditions, that the latitude arc will be bent more or less out of true vertical alinement and this necessarily interferes with obtaining the accurate adjustment between it and the vernier 30 which is required. To guard against non-alinement of the arc 29, and lateral displacement thereof from its vertical plane from any cause and to insure rotation thereof in the same plane with the vernier, I have channeled the lower edge of the arc, see Fig. 1, at 33, to receive a guide or flange 34 on the vernier 30. By this means the arc 29 is caused always to travel in the same vertical plane and desired adjustment with the vernier 30. For locking the latitude arc in adjusted position, I have provided the following novel device. The base 7 is provided near its lower end with an arm 35 extended laterally therefrom and this arm carries at its outer end opposed bosses 36—37, Fig. 6. The boss 36, Figs. 1, 6, carries a spring barrel 38 containing a coiled spring 39 and a plunger 40, which plunger is normally resiliently pressed outward by the spring 39. The boss 37 is threaded internally and carries an adjusting or slow-motion screw 41 opposed to the plunger 39, and is preferably split at least through a part of its length and provided with a locking screw 41ᵃ for the screw 41.

The arc 29, Figs. 1, 7, is provided at its opposite faces with two opposed clamping plates or members 42—43 forming, together with a screw 44 threaded therethrough, a clamping device for said arc. In order that this clamping device may work easily and accurately at all times, I have conceived the idea of supporting it movably, and preferably from the post 6, and to that end have provided an arm 45 depending pivotally therefrom and carrying said clamping members 42—43 at or near its lower end, the squared end of the arm 45 being positioned between the opposed plunger 40 and the screw 41. The clamping member 43 is provided with a flange 47 which is received in a channel 33 in the arc 29 thereby coöperating with the plate 30 to retain the arc 29 in true adjustment relative to the base 7 and main telescope 3. The screw 44, Fig. 7, may be provided, for convenience, with a handle 48. After the arc 29 has been substantially adjusted to the vernier 30 and the arc clamped in position by the clamp 43, any further minute adjustment may be effected by the slow-motion screw 41 and plunger 40 acting against the depending end of the arm 45.

At its objective or, Fig. 1, left-hand end, the solar telescope 15 is provided with the usual reflector 49. This reflector, Fig. 9, may be of any desired construction and herein is of glass and provided with the raised edge 50 which acts as a frame or carrier therefor. The frame or carrier 50 has, see Figs. 2 and 9, at opposite sides, trunnions 51—51 received in bearings 52—52 on the end of the telescope. On the outer end, Fig. 2, of the left-hand trunnion 51, there is rigidly secured an arc carrying arm 53 carrying at its outer and wider end, Fig. 1, the declination arc 54 graduations of which may be indicated thereon or on a plate 55 secured thereto. On the side of the telescope 15 there is secured, as by a squared post 56, a vernier plate 57 to coöperate with the arc 54, or the graduations of the vernier may be carried by a plate 58 secured to the plate 57 by screws 59, the apertures in the plate 58—58 being somewhat larger than necessary to receive the screws 59 to permit both vertical and lateral adjustment of the plate relative to the arc 54. As in the case of the latitude arc 29, the arc 54 is channeled at 60, Fig. 8, to receive a flange 61 on the vernier 57 to secure proper vertical travel and the necessary accurate adjustment of the arc 54 with the vernier and guard against springing of the arm 53 and thus the bearing for the mirror trunnion 51.

For locking the arc in adjusted position with the vernier 57, Figs. 2, 8, I have provided means similar to that provided in the case of the declination arc and comprising opposed plates 62 carried by an arm 63 pivotally mounted on the trunnion 50, said plates having a screw 64 threaded therethrough and provided with a convenient handle 65 for receiving between them the flange 61. The plates 62 are caused to grip the flange 61 between them by means of the screw 64. For more accurate adjustment at any time I have provided, see Fig. 8, also the slow-motion screw 66 threaded into a split boss 67 on the rear face of the arm 53, which works in opposition to the spring actuated plunger 68 in the spring barrel 69, the squared section 70 of the arm 63 being positioned between the screw 66 and the plunger 68. By pivoting the arm 63 to the trunnion 51 the arc 54 is also caused to travel freely and is retained in accurate adjustment with the vernier 57. The reflector 49 is normally positioned at an angle of 45 degrees to the arc 54 when it is set at zero.

The telescope 15 is provided near its front end, see Fig. 2, with the usual hour marks 71 and the telescope is also, for convenience, provided with an enlarged thumb wheel 72 for rotating it within the clamping ring 22.

While the use of the solar attachment is well understood by those who have occasion to use it, I may say that to use the solar attachment, first set off on the proper arcs the latitude of the station and the sun's declination properly corrected. The instrument is next carefully leveled and the apparent time set off on the hour circle. The transit is then oriented to the meridian. The plates are first set to zero and the sun's image brought into the field of the solar telescope before setting the lower clamp; then the sun's image is brought accurately between the equatorial wires with the lower tangent screw; this gives the solar meridian. The transit may then be used for any normal function.

To all who have had occasion to use the solar attachment its advantages are well known. The foregoing described improvements, all devised to secure greater accuracy in results, will also be fully appreciated. For instance, the solar base plate is mounted upon the foot posts, thereby relieving the strain due to imperfect adjustment obtained by other constructions; the base plate is adjusted by means of capstan nuts and counter-sunk ball-washers removing all possibility of strain on the base plate; the right angle triangular form of the base plate permits adjustment about either its vertical or horizontal axis without disturbing the other; the axis of the latitude arc and solar telescope is so arranged that its position may be tested with the striding level without removing the auxiliary telescope; the adjustability of the solar telescope with respect to the axis of the latitude arc; the interlocking latitude and declination arcs and verniers and clamps and the ability to swing the mirror around instantly to permit direct sighting through the auxiliary telescope are all features that will be appreciated by those skilled in the art.

When it is realized that in substantially all the territory outside the original thirteen colonies, all surveys have been based upon the true meridian it will be obvious that every improvement of the means for quickly and accurately obtaining the meridian becomes of great importance. In surveying through areas of heavy timber and dense undergrowth where short forward sights are generally frequently taken to avoid expensive cuttings, as many as twenty-five solar observations are often taken, each independent of the other. It will be readily seen that the utmost accuracy of result and the economy of time are of the greatest value under such conditions.

Having herein described one form of my invention for illustrative purposes, which however, may be varied in detail without departing from the spirit of the invention, I claim—

1. A solar transit having, in combination, a standard with a main telescope thereon, a solar telescope, and axis adjusting means comprising a triangular solar telescope base member on the standard for adjusting one end of the pivotal axis of the solar telescope relative to the opposite end thereof normal to the pivotal axis of the main telescope while the solar telescope is in operating position.

2. A transit having a standard with a main telescope thereon, a solar telescope base supported at three points on the standard permitting adjustment of one end of the solar telescope pivotal axis bearing of the base relative to the opposite end thereof normal to the pivotal axis of the main telescope.

3. A transit having a standard with a telescope thereon, a solar telescope base on the standard; a telescope post on the base, and a solar telescope supporting member on the post each having a coöperating striding level carrying member thereon for leveling the base.

4. A solar transit having, in combination, a standard, a main telescope movable thereon; a solar attachment adjustably mounted on and laterally relatively to the standard and below the main telescope including a solar telescope, and a single adjustable member permitting adjustment of the pivotal axis of the solar telescope to a greater extent at one end thereof than at its opposite end and normal to the pivotal axis of the main telescope.

5. A solar transit comprising, in combination, a standard; and a solar attachment therefor comprising a solar telescope, a triangular base therefor, base adjusting means permitting angular adjustment of the axis of the solar telescope to an unequal extent throughout the length of the axis.

6. A solar transit comprising, in combination, a standard; and a solar attachment therefor comprising a base and a telescope, mounted directly thereon, and base adjusting means comprising a plurality of posts secured to said base and adapted to be secured to the standard, and means on the posts for effecting angular adjustment of the base and pivotal axis of the solar telescope unequally throughout the length of the axis.

7. A solar transit comprising, in combination, a standard; and a solar attachment therefor comprising a telescope, a base therefor, and base adjusting means comprising three substantially triangularly positioned posts secured to said base and to said standard, a plurality of opposed locking members for each post, and a plurality of segmental collars on each post between the locking members and base, having curved bearing contact with the base.

8. A solar attachment for transits comprising a perforated base, posts in the perforations, the base having curved bearing surfaces adjacent the perforations, segmental collars in said bearings, and locking means for adjustably locking the posts to the base.

9. A solar attachment for transits comprising a perforated base, posts in the said perforations, the base having curved bearing surfaces adjacent the perforations, curved segmental collars in said bearings, locking means for adjustably locking the base to the posts, a post extended laterally from the base, and a telescope rotatably mounted thereon.

10. An attachment for transit comprising a base, supporting and securing means therefor, a rotatable telescope supporting member on the base, a telescope supported thereby, and means for adjusting the base angularly to effect greater movement of one end of the telescope supporting member than the opposite end for axial adjustment of the telescope.

11. A solar attachment for transits comprising a base, three point supporting and securing means thereon, providing the base with a three-point support, means including curved bearings on the base for adjusting the base on these supports.

12. A solar attachment for a transit comprising a base, supporting and adjusting means therefor, a rotatable telescope member on the base, a telescope carrying member on the rotatable member, a telescope thereon, and means for bodily adjusting the telescope sidewise relative to the carrying member.

13. A solar attachment for transit comprising, in combination, a standard, a base, means for adjusting the base on and relative to the standard, a rotatable telescope supporting member on the base having a telescope carrying member, a telescope thereon, means for bodily adjusting the telescope sidewise relative to the carrying member, and a latitude arc carried by the carrying member.

14. A solar attachment for transit comprising, in combination, a standard, a base, a vernier adjustable on the base, means for bodily adjusting the base sidewise on and relative to the standard, a rotatable telescope supporting member on the base, a telescope carrying member on the rotatable member, a telescope thereon, a latitude arc carried by the carrying member, and laterally acting arc clamping means suspended from the supporting member.

15. A solar attachment for transit comprising, in combination, a standard, a base, a vernier adjustable thereon, means for adjusting the base sidewise on and relative to the standard, a rotatable telescope supporting member on the base, a telescope carrying member on the rotatable member, a telescope thereon, a latitude arc carried by the carrying member, and arc clamping means movably mounted on the supporting member.

16. A solar attachment for transits comprising in combination a base, a vernier adjustable thereon, a standard, means for adjusting the base on and relative to the standard, a telescope rotatable supporting member on the base, a telescope carrying member on the rotatable member, a telescope thereon, a latitude arc carried by the carrying member, arc clamping means movably mounted, and means on the solar base for adjustably positioning the arc clamping means and clamping the arc.

17. A solar attachment for transits, comprising in combination a base, a vernier adjustable thereon, a standard, means for adjusting the base on and relative to the standard, a telescope rotatable supporting member on the base, a telescope carrying member on the rotatable member, a telescope thereon, a latitude arc carried by the carrying member, and arc clamping means comprising a pivoted arm and clamping members carried by the arm to clamp the arc to the vernier.

18. A solar attachment for transits, comprising in combination a base, a vernier adjustable thereon, a standard, means for adjusting the base on and relative to the standard, a telescope rotatable supporting member on the base, a telescope carrying member on the rotatable member, a telescope thereon, a latitude arc carried by the carrying member, arc clamping means comprising a pivoted arm and clamping members carried by the arm to lock the arc to the vernier, and a declination arc carried by the telescope.

19. A solar attachment for transits, comprising in combination a base, a vernier adjustable thereon, a standard, means for adjusting the base on and relative to the standard, a telescope rotatable supporting member on the base, a telescope carrying member on the rotatable member, a telescope thereon, a latitude arc carried by the carrying member, arc clamping means comprising a pivoted arm and clamping members carried by the arm to lock the arc to the vernier, a declination arc carried by the telescope, and a mirror movably carried by the arc member.

20. A solar attachment for transits, comprising in combination a base, a vernier adjustable thereon, a standard, means for adjusting the base on and relative to the standard, a rotatable telescope supporting member on the base, a telescope carrying member on the rotatable member, a telescope thereon, a latitude arc carried by the carrying member, arc clamping means comprising a pivoted arm and clamping members carried by the arm to lock the arc to the vernier, a declination arc carried by the telescope, a mirror movably carried by the arc member, and clamping means for the arc.

21. A solar attachment for transits, comprising in combination a base, a vernier adjustable thereon, a standard, means for adjusting the base on and relative to the standard, a rotatable telescope supporting member on the base, a telescope carrying member on the rotatable member, a telescope thereon, a latitude arc carried by the carrying member, arc clamping means comprising a pivoted arm and clamping members carried by the arm, a declination arc carried by the telescope, a vernier therefor, a mirror movably carried by the arc member, means for clamping the arc laterally to the vernier and adjusting means for the clamping means.

22. A solar attachment for transits, comprising in combination a base, a vernier adjustable thereon, a standard, means for adjusting the base on and relative to the standard, a rotatable telescope supporting member on the base, a telescope carrying member on the rotatable member, a telescope thereon, a latitude arc carried by the carrying member, arc clamping means comprising a pivoted arm and clamping members carried by the arm, a declination arc carried by the telescope, a mirror movably carried by the arc member, pivotally mounted clamping means for the arc to clamp the same to the vernier, adjusting means for the clamping means.

23. A solar attachment for a transit comprising the base 7, an adjusting and supporting member 9 therefor, having the washer 10, additional supporting posts 9, 9, having nuts 11, 12, capstan collars 13, 13, for the posts, the lateral shaft 6 on the base, and having a sleeve 16 with flanges 17—19, nut 18 on the shaft 6, telescope supporting member 21 on the flange 19, telescope 15, recessed bearings 22, 22, on the member 21; post 25, nuts 26, 26, for same for adjusting one bearing 22, and telescope 15; arm 28 on the member 21, channeled arc 29 on the arm 28, adjustable and flanged vernier 30, posts 31, 31, therefor, arm 35 on the base 7 having bosses 36, 37, spring barrel 38, spring 39 and plunger 40 on the boss 36, slow motion screw 41 having locking screw 41$^a$ on the boss 37, pivoted clamping member 42 and flanged member 43 and screw 44 and arm 45 therefor; reflector 49 for telescope 15 mounted in trunnions 51, 51, arm 53, channeled declination arc 54 thereon, flanged vernier 57 and plate 58, clamping screws 59, 59, therefor, pivoted arm 63 having plates 62, 62, and screw 64, split boss 67 with screw 66 on the arm 53, spring actuated plunger 68 and spring barrel 69.

24. A transit having, in combination, a standard with a main telescope thereon, a solar telescope base on the standard, a solar telescope supporting member on the base, a solar telescope carrying member on the supporting member, said supporting and carrying members constituting a striding level carrying means between the outer end of the supporting member and the standard for leveling the supporting member while it is in use.

In testimony whereof, I have signed my name to this specification, in the presence of two subscribing witnesses.

LOUIS F. BUFF.

Witnesses:
EVERETT S. EMERY,
ELIZABETH P. HILLIARD.

Copies of this patent may be obtained for five cents each, by addressing the "Commissioner of Patents, Washington, D. C."